Dec. 30, 1969      A. GREENWOOD ET AL      3,486,195
                    DUPLEX EXTRUDER HEAD
Filed Jan. 18, 1967                        4 Sheets-Sheet 1

INVENTORS
JACK T. HALE
ALAN GREENWOOD
BY
R.J.Washburn
AGENT

INVENTORS
JACK T. HALE
ALAN GREENWOOD
BY
AGENT

Dec. 30, 1969   A. GREENWOOD ET AL   3,486,195
DUPLEX EXTRUDER HEAD
Filed Jan. 18, 1967   4 Sheets-Sheet 3

INVENTORS
JACK T. HALE
ALAN GREENWOOD
BY
R. H. Washburn
AGENT

INVENTORS
JACK T. HALE
ALAN GREENWOOD
BY
AGENT

United States Patent Office 3,486,195
Patented Dec. 30, 1969

3,486,195
DUPLEX EXTRUDER HEAD
Alan Greenwood, Kent, Ohio, and Jack T. Hale, Malvern, Pa., assignors to The Goodyear Tire & Rubber Company, Akron, Ohio, a corporation of Ohio
Filed Jan. 18, 1967, Ser. No. 610,099
Int. Cl. B29f 3/04
U.S. Cl. 18—13                    5 Claims

ABSTRACT OF THE DISCLOSURE

Apparatus for extruding a bipartite strip comprising a layer of tire tread rubber superposed on a wider layer of rubber for the sidewall of a tire. Two oppositely oriented extruders feed into a common die head having a pair of complexly configured flow passages respectively associated with the pair of extruders and leading to a die plate, or former, for shaping the final bipartite strip. The die head has a removable, reversible plug in which the entire complex portions of the flow passages are wholely formed, while the portion of the body of the head receiving the plug, as well as the portion of the plug seating in the body have regular and simple form. The plug carries a removable, replaceable nose piece which serves to redirect internal passages through the die head and to determine, at least partly, the shape of the extrudate feeding to the die plate.

---

The foregoing abstract is not to be taken as limiting the invention of this application, and in order to understand the full nature and extent of the technical disclosure of this application, reference must be made to the accompanying drawings and the following detailed description.

The embodiments of the invention hereinafter described represent improvements of tire tread duplex extrusion apparatus of the type disclosed in U.S. Patent No. 2,444,831. Duplex extruders generally comprise a pair of oppositely directed extruders feeding into a common die head in which the two extrudates from the two extruders are shaped and combined into a bipartite strip including a layer of tread rubber superposed on a wider layer of sidewall rubber. In such prior apparatus the complex geometry of the surfaces on the various elements forming the passages for the flow of material through the extruder die head rendered such apparatus unduly difficult to manufacture with attendant high costs of manufacture. It is a primary object of this invention to provide a simplified construction for the die head of such apparatus which will facilitate manufacture, result in reduced costs of manufacture and improve the versatility and ease of maintenance of the apparatus.

Other objects will be in part obvious, and in part pointed out more in detail hereinafter.

Figures 1, 2:
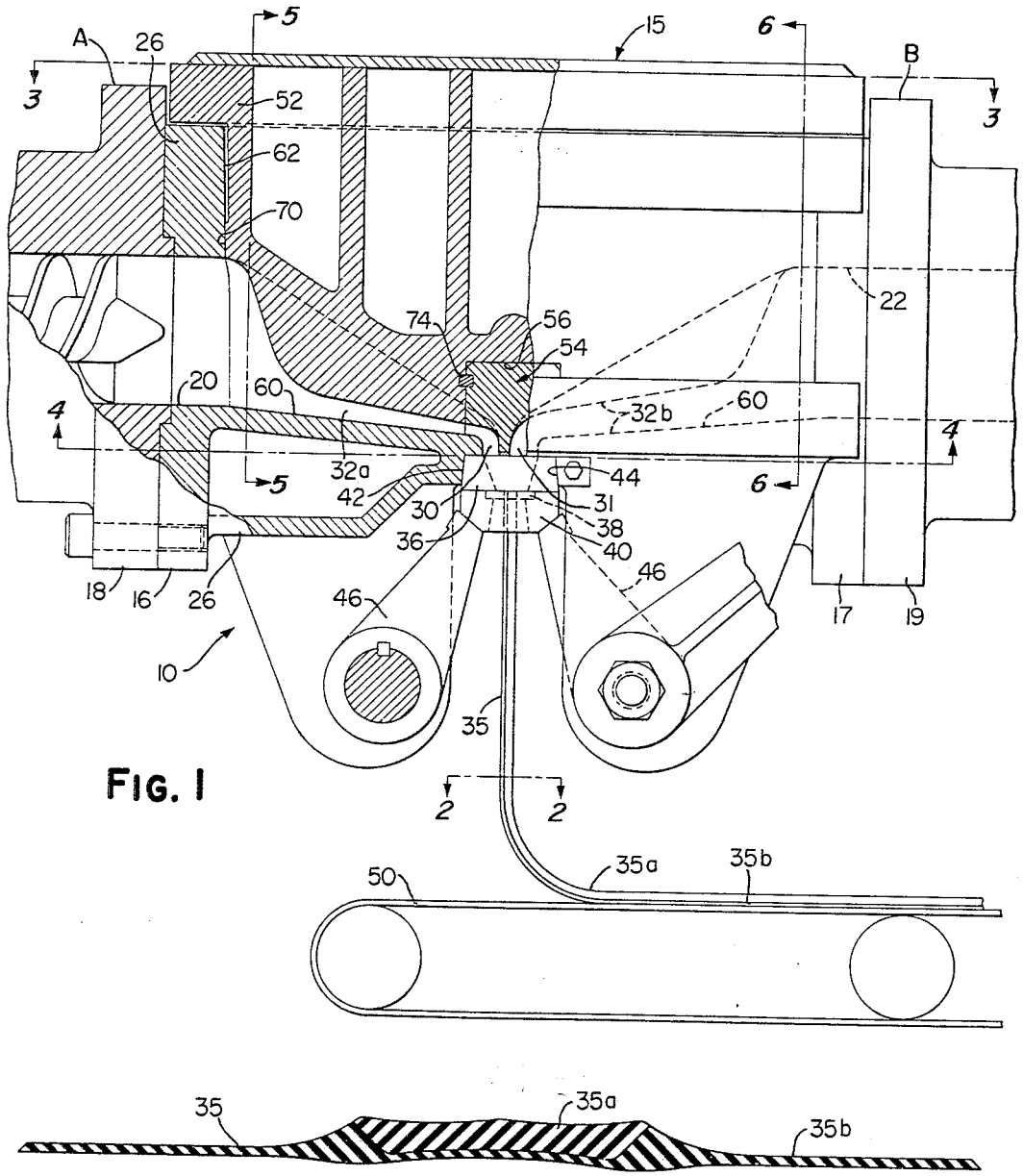
FIGURE 1 is a front elevation of apparatus embodying the present invention, a part of the assembly being shown in section.
FIGURE 2 is a cross-section, as indicated by line 2—2 in FIGURE 1, of a typical bipartite strip as extruded.
Figure 4:
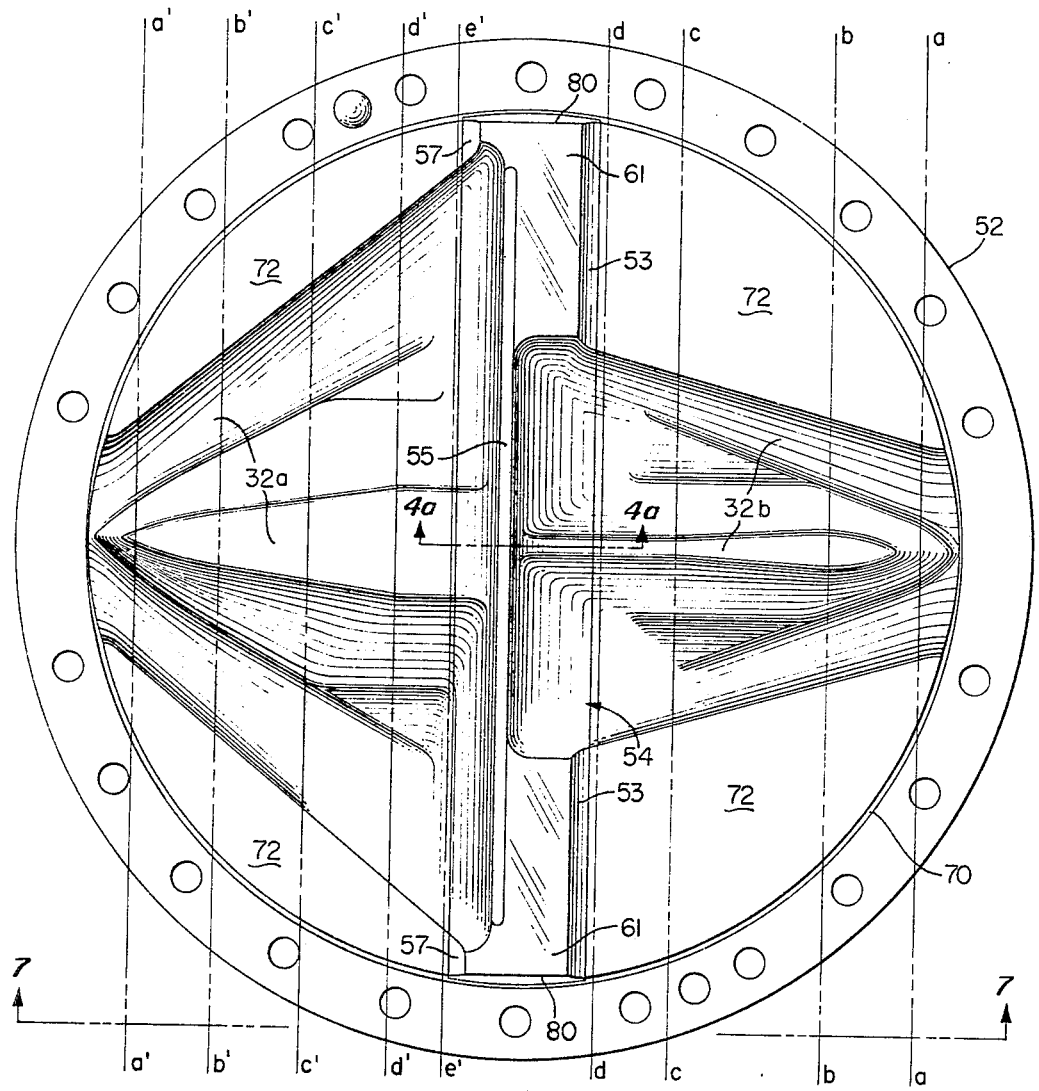
FIGURE 4 is an inverted, or bottom, plan view of the cavity plug, removed from the cavity, oriented as indicated by line 4—4 in FIGURE 1.
Figure 5:
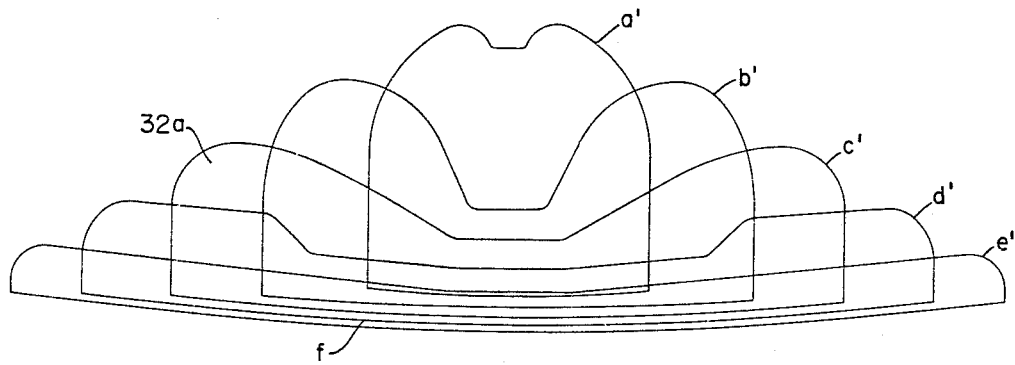
Figure 6:
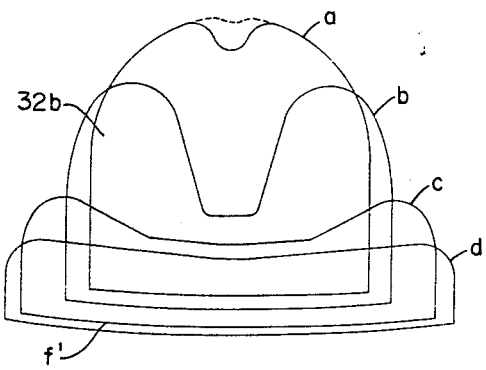

FIGURES 5 and 6 are superimposed successive sectional outlines of passages within the apparatus, taken generally as indicated by lines 5—5 and 6—6 in FIGURE 1 and specifically as indicated in FIGURE 4.

Figure 7:
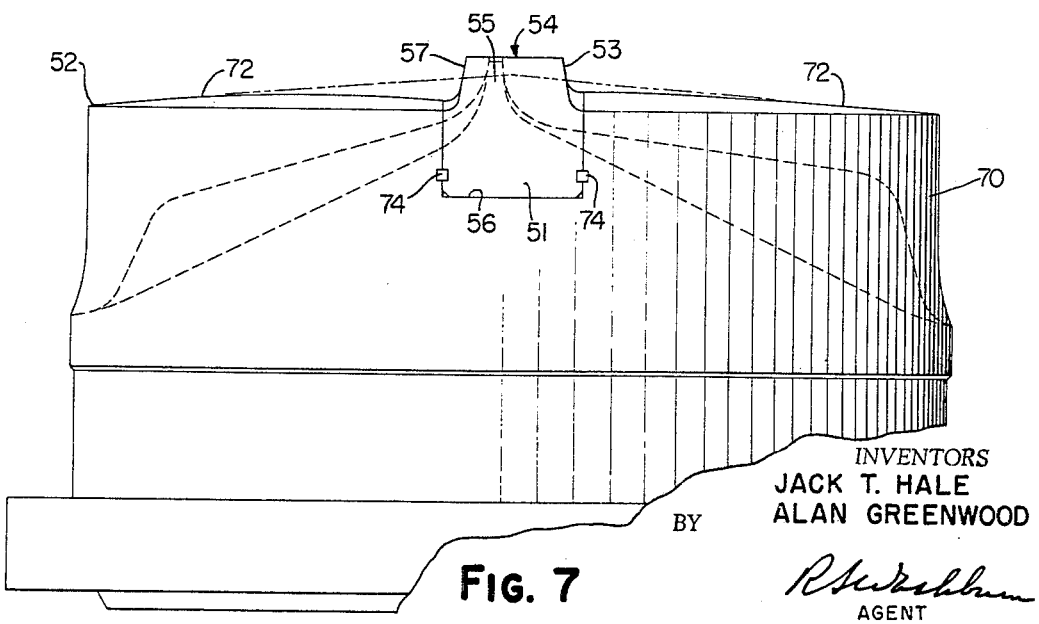

FIGURE 7 is a partial elevation of the cavity plug according to the invention, viewed as indicated by line 7—7 in FIGURE 4.

FIGURE 1 depicts a duplex extruder apparatus 10 comprising a pair of extruders A and B. Since the extruders may be any suitable, well known, commercially available machines, no detailed description of them is necessary. The extruders are arranged generally oppositely to each other so that they will deliver material in opposite horizontal directions and toward each other. Disposed between the outlets of the extruders is an extrudate combining and forming means or tread head generally indicated at 15 and having a pair of inlet flanges 16, 17 adapted to be secured, respectively, to the outlet flanges 18, 19 of the extruders A and B, respectively. The tread head 15 incorporates first and second inlets 20, 22, respectively communicating at one end with the outlets of the extruders. The tread head 15 is further provided with a pair of delivery ports 30, 31, and with material flow passages 32a and 32b connecting the inlets 20 and 22 with the delivery ports 30, 31. Each of the passages 32a, 32b is progressively transformed in its cross-sectional shape in accordance with known practice in order to spread a plastic material from the cross-section it has when entering the inlets 20 and 22 to the desired relatively wider and thinner cross-sectional shapes of the component strips to be issued from the respective delivery ports 30, 31. The passages 32a, 32b slope or incline generally downwardly from the inlets 20, 22 and then are redirected generally vertically downwardly prior to reaching the delivery ports or ends 30, 31 of the passages.

The plastic material components 35a and 35b of a composite tread strip which issue from the two delivery ports 30, 31 are joined in superposed centered relation in a die block 36 and are extruded in final composite form through a die plate 38 held in the die block 36 by a die cap 40. The die block 36 is positioned against a seat 42 formed in the bottom of the housing or body 26 of the tread head and is held in registry with the delivery ports 30, 31 by a pair of guides 44 and by clamping arms 46 which are actuated by fluid cylinders (not shown). The plastic extrudate or bipartite strip 35 is finally shaped by the die plate 38 to its desired cross-section and is composed of two parts differing from one another in physical characteristics, such as width, thickness, area, composition, or density, as is represented in FIGURE 2.

Figure 3:
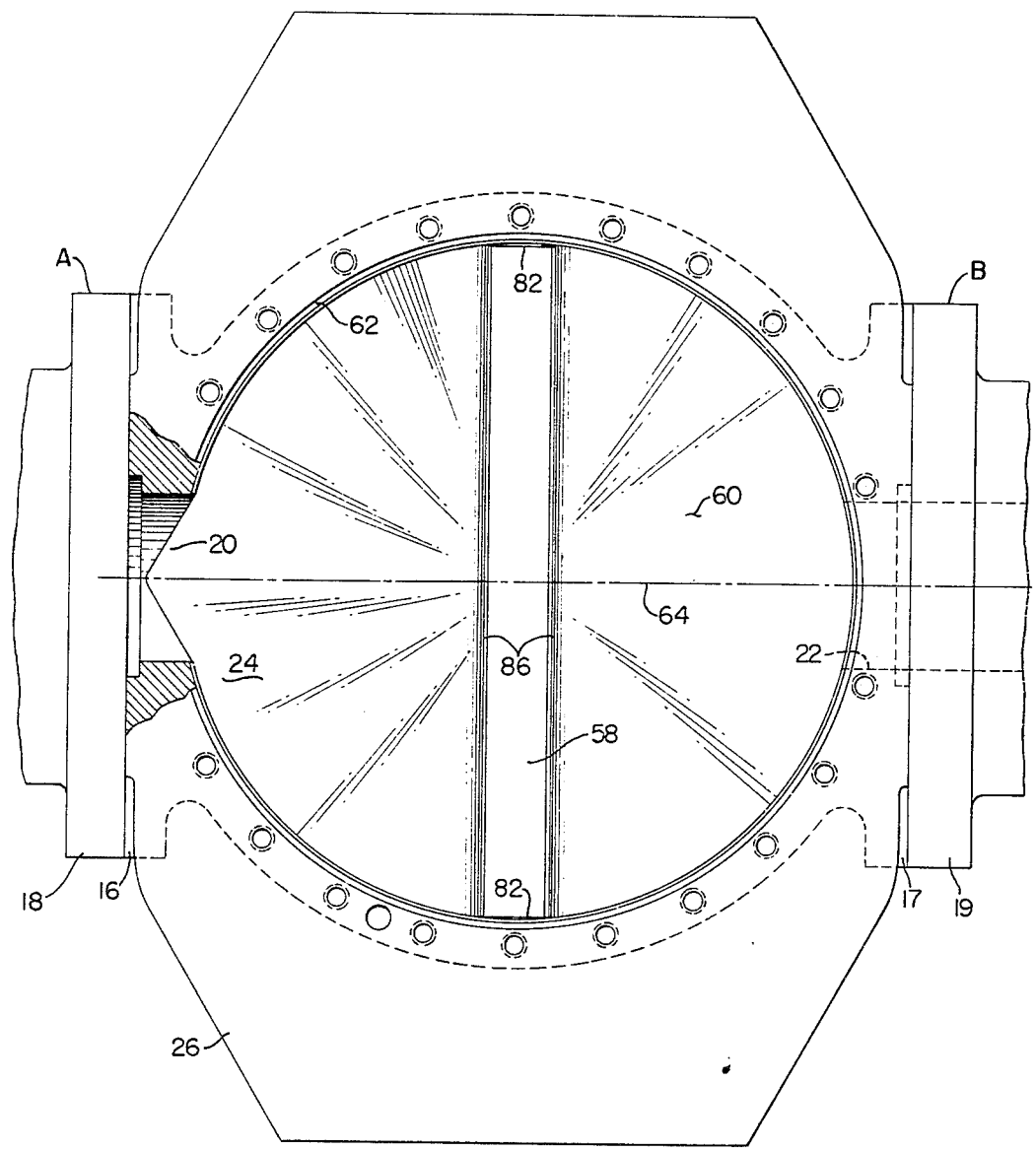
FIGURE 3 is a plan view of the housing taken generally as indicated by line 3—3 in FIGURE 1.

With reference to FIGURES 1 and 3 the tread head has a main body or housing 26 which includes an upwardly opening chamber 24 into which the inlets 20, 22 open. The chamber 24 itself is defined by a substantially cylindrical side wall 62 and a conical floor 60 coaxial with the side wall 62. The cylindrical wall 62 of the chamber is preferably formed with a slight taper, about ⅛ inch per foot. The floor 60 of the chamber 24, in the embodiment shown is conical, the included apex angle being about 170 degrees, which angle or slope appears in FIGURE 1. The slope or angle of the floor need not be large, and in fact the apex angle may be 180 degrees, or in other words the floor may be flat and without slope. Therefore, where the terms conical is used herein and in the appended claims to describe the floor 60, it is intended that this term include apex angles up to and including 180 degress; also contemplated is the sloping of the floor in a direction opposite from that shown in FIGURE 1.

A particular advantage of the invention lies in the fact that the housing chamber 24 can be bored and faced to form the side wall 62 and floor 60, respectively, by common and relatively simple machining procedures and readily available machine tools since the chamber wall 62 and floor 60 are both surfaces of revolution evolved by straightline generators, whereas apparatus for duplex extrusion hereto fore in use has required complicated polygonal or multi-faceted chamber surfaces which have been greatly more difficult and more expensive to make.

The floor 60 of the chamber 24 is provided with a substantially rectangular slot or opening 58 which extends to and opens outwardly of the bottom of the housing 26. The slot 58 also extends diametrally of and substantially entirely across the chamber 24 terminating in slot end walls 82. The slot 58 has sides 86 which are allochiral and extend transversely with respect to a line 64 joining the inlets.

With reference to FIGURES 1, 4 and 7, the tread head 15 also includes a V-block, or cavity plug 52, which is closely fitted within the chamber 24. The plug 52 has a generally cylindrical exterior surface 70 and a conical bottom surface 72 which surfaces are shaped corresponding to, and mate or fit closely with, the chamber wall 62 and floor 60, respectively. The term conical is used in connection with the surface 72 in the same manner as described above in connection with the floor 60 of the body 26. With particular reference to FIGURE 7, a nose piece is fitted into a slot 56 extending diametrally across the bottom of the plug 52 and is secured therein by a pair of removable keys 74. A septum or portion 55 of the nose piece 54 projects outwardly beyond the bottom surface 72 of the plug 52 and extends into the opening 58 in the floor 60 of the housing 26 to divide the opening 58 into two portions, respectively, providing the delivery ports 30, 31.

Figure 4A:
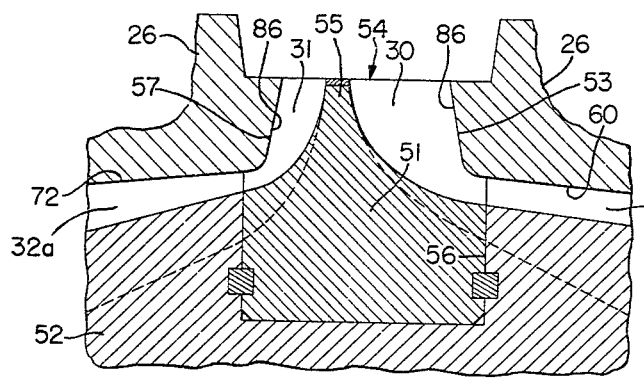
FIGURE 4a is a fragmentary cross-sectional view taken substantially along the line 4a—4a in FIGURE 4.

More specifically, and with reference to FIGURES 4, 4a and 7, the nose piece 54 comprises an elongate rectangular cross-sectional base 51 seated in the slot 56 in the plug 52. At each of its end portions 61 the nose piece 54 projects outwardly beyond the bottom 72 of the plug 52 and into the slot 58 in the body 26 with the end surfaces 80 of the nose piece closely fitting the ends 82 of the slot 58 in mating engagement. The portions 61, 61 of the nose piece fitting within the slot 58 are also provided with side walls 53, 57 which, adjacent the ends of the nose piece 54 and slot 58, are in seating engagement with the side walls 86 of the slot. The body or base 51 of the nose piece 54 contains terminal portions of the channels, more fully described below, which comprise the passages 32a and 32b through the tread head 15 and particularly through the cavity plug 52, of which the nose piece 54 forms a part. The side walls 53, 57 and the septum 55 are so cut back laterally and in width respectively intermediate their ends and over substantial portions of the length of the nose piece, as to space each side of the septum 55 from the respective side wall 86 of the slot 58 to provide predetermined widths at the delivery ports 30, 31, while the lateral extent of the cut back of the side walls 53, 57 provides a predetermined length in each port 30, 31, Where the channel terminal portions of the passages 32a and 32b in the nose piece join the like channels of the passages 32a and 32b of the plug the channel surfaces preferably match to be smoothly continuous. In this connection the portions of the side wall 53 of the nose piece which seat on the respectively associated side wall 86 of the slot 58 are of substantially greater length than are the portions of the side wall 57 which seat on their respectively associated side wall 86 of the slot 58. In the specific embodiment shown, this is because the passage 32a is, at its downstream end, much wider than is the downstream end of the passage 32b. It is within the scope of this invention to substitute nose pieces having differently configured cut out portions in side walls and base to provide different configurations for the delivery ports 30, 31 leading to the die block 36 and former or dieplate 38. The nose piece 54 is removably affixed to the plug 52 not only to permit exchanging nose pieces but also to materially facilitate finishing the bottom surface 72 of the plug.

In order to provide uniformity of dimension and quality in the bipartite strip issuing from the apparatus, it is very desirable that the flow passages through the tread head be configured such that the material passing through the delivery ports or at the die plate will have the same mass flow rate at each increment of area of the strip or layer. As a result, the surfaces of the flow passages in the tread head are of necessity quite complex surfaces. For example, in FIGURE 5 are illustrated exemplary contours of the passage 32a in the plug at successive transverse planes indicated by the like letters in FIGURE 4. Likewise in FIGURE 6 are illustrated exemplary contours of the passage 32b in the plug at successive planes indicated by like letters in FIGURE 4. In accordance with this invention all of the complexly configured portions of the passages 32a, 32b are located within the plug 52 including the nose piece 54 in the form of open channels providing convenient accessibility for the precise forming of the desired contours. The cross-sectional perimeter of the passages is completed by the floor 60 of the chamber 24 in the tread head, the floor 60 defining only the simple regular boundary of the passage cross-section such as indicated at $f$ and $f'$ in FIGURES 5 and 6. Thus, merely by substituting a different plug one may obtain flow passages 32a, 32b of completely different configuration and/or width. This change in plugs does not require replacement of the tread head, which replacement is difficult and time consuming.

A further advantage of the tread head of this invention is that the cavity plug may be reversed in the body 26 so so, for example, the first passage 32a is placed in material flow communication with the first inlet 20 or is placed in material flow communication with the second inlet 22. This provides the advantage, for example, that the composite, or bipartite, strip can be delivered to the conveyor 50 with either the tread surface, or the sidewall-undertread surface, facing upwardly on the conveyor 50, FIGURE 1, or that the strip can be removed by a conveyor (not shown) in a direction opposite to that of the conveyor 50.

The cavity plug 52 can be easily removed from the housing chamber 24 to provide access for inspection or cleaning of both the chamber and the plug, as for example, when the extruder is shut down for an extended period, or when a desired composition would be degraded by a residue from a previous composition, Minor changes in dimensions of the final strip can be accommodated by selecting a suitable die plate 38 and major changes of compositions or of dimensions of the strip are provided merely by substitution of a cavity plug having the passage and delivery port dimensions and contours adapted particularly to the strip to be produced, while the housing 26 and extruders A and B are undisturbed.

While a duplex extruder for tire tread-sidewall combined strip has been described to illustrate a preferred embodiment of the instant invention, it will be appreciated that the features and advantages of the invention can with facility be applied to other tire component extrudate combinations, whether superposed in centered or off-centered relation or in other juxtaposed relation, such as blackwhite sidewall strip, inner-tube tubing, or like rubber tire related components, and that various adaptations and modifications can be made without departing from the spirit or scope of the invention.

What is claimed is:

1. In a duplex extruder for extruding a bipartite strip of superposed layers of plastic materials of different characteristics such as a tire tread-undertread-sidewall strip wherein the extruder includes a tread head having a first and a second inlet oppositely oriented toward each other and each adapted to be secured to an extruder outlet, a pair of side-by-side delivery ports and a pair of material flow passages each having a cross-sectional shape which varies from one end of the passage adjacent one of said inlets to the other end of the passage adjacent one of said delivery ports, said tread head including a housing having a chamber into which said inlets open, said chamber having a wall and a floor, and further including a cavity plug received in said chamber and having a sidewall closely fitting to the wall of said chamber and a bottom closely fitting to said floor, said material flow passages being provided in part by open channels in said bottom of said plug with said channels being closed by portions of said floor extending thereacross, said sidewall and bottom of said plug cooperating respectively with said wall and said floor of said chamber to constrain plastic material passing through said inlets to move only through said passages and not otherwise between said housing and said plug, the improvement wherein said wall of said chamber and said sidewall of said plug comprise respectively single generally continuous cylindrical surfaces and said floor and said bottom comprise respectively generally continuous conical surfaces coaxial with each other and with the axis of said cylindrical surfaces.

2. In a duplex extruder for extruding a bipartite strip of superposed layers of plastic materials of different characteristics such as a tire tread-undertread-sidewall strip wherein the extruder includes a tread head having a first and second inlet oppositely oriented toward each other and each adapted to be secured to an extruder outlet, a pair of side-by-side delivery ports and a pair of material flow passages each having a cross-sectional shape which varies from one end of the passage adjacent one of said inlets to the other end of the passage adjacent one of said delivery ports, said tread head including a housing having a chamber into which said inlets open, said chamber having a wall and a floor, and further including a cavity plug received in said chamber and having a sidewall closely fitting to the wall of said chamber and a bottom closely fitting to said floor, said material flow passages being provided by open channels in said bottom of said plug with said channels being closed by portions of said floor extending thereacross, the improvement wherein said floor of said chamber and said bottom of said plug comprise respectively coaxial conical surfaces having included apex angles equal to each other and greater than 150 degrees, said surfaces cooperating to constrain plastic material passing through said inlets to move only through said passages and not otherwise between said housing and said plug.

3. In apparatus according to claim 2 wherein said chamber and said opening are symmetrical with respect to the longitudinal axis of the chamber, said chamber having a first and a second inlet, said plug having a first and a second passage and being received into said chamber in a selected one of two positions, one of said positions being that in which said first inlet is in flow communication with said first passage, and the other of said positions being that in which said first inlet is in flow communication with said second passage.

4. In a duplex extruder for extruding a bipartite strip of superposed layers of plastic materials of different characteristics such as a tire tread-undertread-sidewall strip wherein the extruder includes a tread head having a first and a second inlet oppositely oriented toward each other and each adapted to be secured to an extruder outlet, a pair of side by side delivery ports, and a pair of material flow passages each having a cross-sectional shape which varies from one end of the passage adjacent one of said inlets to the other end of the passage adjacent one of said delivery ports, the improvement wherein the tread head includes a housing having a chamber into which said inlets open said chamber being defined by a substantially cylindrical wall and a conical floor coaxial with said wall, said floor being provided with a substantially rectangular elongated opening extending through said floor between said floor and an exterior surface of said housing and longitudinally in a direction diametrically across said chamber and transversely with respect to said flow passages, a generally cylindrical cavity plug received in said chamber and having a cylindrical sidewall closely fitting to the wall of said chamber and a bottom closely fitting said floor, said cavity plug being provided with an elongated removably affixed nose piece extending longitudinally in a direction parallel to said opening, a portion of said nose piece projecting into said opening in laterally spaced relation to the sides of said opening, whereby said opening is divided into two passages forming said pair of delivery ports, said material flow passages being provided in part by open channels in said bottom of said plug with said channels being closed by portions of said conical floor extending thereacross, said side wall and bottom of said plug cooperating respectively with said wall and said floor of said housing to constrain plastic material passing through said inlets to move only through said passages and not otherwise between said housing and said plug.

5. In duplex extruder apparatus according to claim 4 wherein said nose piece has a pair of open channels respectively forming a continuation of said channels in said plug and respectively forming the downstream terminal portion of said flow passages through the tread head, said open channels in the nose piece being redirected intermediate their respective entry and exit ends from a generally inclined to a generally vertical orientation, said channels in the nose piece being closed by said floor and each by one of the side walls of said opening in the floor.

References Cited

UNITED STATES PATENTS

| | | |
|---|---|---|
| 2,444,831 | 7/1948 | Kilborn. |
| 2,569,373 | 9/1951 | Fay. |
| 2,897,543 | 8/1959 | Weston et al. |
| 3,280,427 | 10/1966 | Smith. |

WILLIAM J. STEPHENSON, Primary Examiner

U.S. Cl. X.R.

18—12